United States Patent
Baumgartner et al.

[11] 3,793,177
[45] Feb. 19, 1974

[54] DEVICE FOR THE CONTINUOUS EXTRACTIVE SEPARATION OF COMPOUNDS OF VALUABLE SUBSTANCES BY ELECTROLYTIC REDUCTION

[75] Inventors: Franz Baumgartner, Grotzingen; Helmut Schmieder; Hubert Goldacker, both of Karlsruhe; Helmut Hausberger, Bad Langenbrucken, all of Germany

[73] Assignee: Gesellschaft fur Kernforschung mbH, Karlsruhe, Germany

[22] Filed: Mar. 22, 1972

[21] Appl. No.: 237,062

[30] Foreign Application Priority Data
Oct. 1, 1971 Germany............................. 2149089

[52] U.S. Cl.................. 204/269, 204/1.5, 204/275, 423/8
[51] Int. Cl............................................. B01k 3/00
[58] Field of Search...... 204/1.5, 257, 269, 275, 86, 204/272; 423/8, 9, 10

[56] References Cited
UNITED STATES PATENTS
1,894,271   1/1933   Hansel et al. ........................ 204/269
3,616,275   10/1971  Schneider et al. ................... 204/1.5

Primary Examiner—John H. Mack
Assistant Examiner—W. I. Solomon
Attorney, Agent, or Firm—Spencer & Kaye

[57] ABSTRACT

A device for continuously extracting compounds of valuable substances which are contained within a first phase. The first phase containing the compounds is mixed with a second phase. The device then separates the compounds by electrolytic reduction of at least one of the valuable substances and transfers the reduced compound into combination with the second phase. The device includes a plurality of stages which are located within housings which are designed as cathodes and are provided with anode cells which are electrically insulated from the cathodes but are in direct communication with the cathodes.

13 Claims, 6 Drawing Figures

DEVICE FOR THE CONTINUOUS EXTRACTIVE SEPARATION OF COMPOUNDS OF VALUABLE SUBSTANCES BY ELECTROLYTIC REDUCTION

BACKGROUND OF THE INVENTION

The present invention relates to a device for the continuous extractive separation of compounds of valuable substances contained in either of the two phases required for extraction by means of electrolytic reduction of at least one of the valuable substances and transfer into the other phase of the substance or substances to be separated.

In order to separate uranium and plutonium compounds by liquid-liquid extraction a multistage mixer-settler apparatus which has electrodes installed in the area where both phases are mixed for electrolytic reduction is often utilized. In this arrangement, the cathodes are located in the mixer chambers, and the anodes, surrounded by diaphragms closed on one side, are located in the settler chambers. The diaphragms serve the purpose of keeping the atomic oxygen generated at the anode away from the organic phase. The length of the vertically arranged mixer chambers is about seven times the length of one side of their square cross section. The settler chambers are inclined relative to the mixer chambers by an angle of 45° and have roughly the same cross section as the mixer chambers. Each mixer chamber is physically connected with three settler chambers located respectively at the bottom of the chambers, in the lower third, and around the middle by corresponding openings; and, conversely, each settler chamber is connected with three mixer chambers.

However, upscaling of such systems results in considerable difficulties. The interface of the individual stages shifts as a function of the loading condition of the phases and of the throughput of liquids, i.e., in one stage, at the end of the extraction apparatus, there is a different quantitative ratio between the two phases than in a stage at the other end of the system. Moreover, the interface level of a stage may vary rather strongly during operation of the system under certain conditions. In this way, part of the diaphragm will unavoidably be plugged up by the organic phase in an area normally in contact with the aqueous phase. This has a negative influence on the quality of separation and extraction, will destroy optimized process conditions and may practically stop electrolytic reduction in such a stage.

If the anode cell is arranged in the mixer chamber, the following difficulties will arise:

As a consequence of the turbulence in the mixer chamber a partial quantity of the aqueous phase saturated with oxygen can not be prevented from entering the cathode space and partially re-oxidizing the reduced valuable substances which are there. Moreover, it is not impossible that the turbulence also could give rise to the passage of the organic phase into the anode space, which would reduce the effective anode surface and result in so-called poisoning of the anode. Moreover, variations in throughput of both phases and different levels of interface, respectively, involve the hazard of a phase reversal, i.e., the aqueous phase, which is required as a continuous phase in the mixed phase and envelops the dispersed organic phase, will rather quickly become a discontinuous phase and thus be enveloped by the organic phase. However, this implies an interruption of the current flow in the respective stage and complete failure of that stage, as far as electrolytic reduction is concerned, which will reduce the efficiency of the system. The possibilities of automatic control and supervision of the separation device are extremely difficult due to the strongly fluctuating current flow during reduction in the mixer chamber.

SUMMARY OF THE INVENTION

An object of the present invention is to create a device for the continuous extractive separation of compounds of valuable substances by means of electrolytic reduction which does not have the disadvantages of previously known systems and ensures failsafe operation of the processes with respect to electrolytic reduction, extraction and separation. Moreover, there should be the possibility of automatic supervision and control of the device due to the continuous and safe functioning of the device and the simple and compact design of the device. Compounds of valuable substances constitutes not only metallic compounds, for instance actinide compounds, but also organic compounds, for instance organic acids.

A multistage extraction apparatus is provided in accordance with the present invention with individual stages designed as the cathodes and with anode cells equipped with an electrical insulation but directly connected with the cathode spaces without any diaphragms.

A first preferred embodiment of the device comprises a multistage mixer-settler with housings of electrolysis cells designed as cathodes and containing anode cells made of an insulating material. In another embodiment of the invention, there is a countercurrent extraction column consisting of an inner tube with column plates installed within the tubes as individual stages, an outer tube arranged coaxial to the inner tube, the two tubes being fixed relative to each other so as to leave an annular gap in between, and of anode cells attached at the respective levels of the plates in at least one of the tubes. In the first preferred embodiment, the individual stages of the mixer-settler have recesses lined with insulation material. The anode cells are arranged in the settler spaces, i.e., in the recesses of the housings of the electrolysis cells, their bottom edge always extending below the bottom level of the settler spaces. Moreover, to improve flow conditions and the geometry of the cathodes, the settler spaces contain internals which, for instance, may be baffles inclined relative to the horizontal line or may consist of several bottom fins extending parallel to the longitudinal axis of the electrolysis housing.

In another embodiment of the countercurrent extraction column, the inner tube and the outer tube are physically connected with each other by penetrations of the wall in the inner tube in the area of the column plates, which penetrations are always made at plate level or below and are provided with an electric insulation. The anode cells extend below the penetrations of the wall. Moreover, the inner tube and the outer tube are physically interconnected by other penetrations of the wall in the inner tube at the bottom end of the column in the area of the discharge opening of the aqueous phase. In a preferred embodiment, the column plates each have at least one tubular insert with the upper edges of these inserts extending beyond the penetrations of the wall. One special advantage of the present invention is the possibility to apply the device to any process in which compounds of valuable substances are separated by liquid-liquid extraction with at least one valuable substance being electrolytically reduced, and to adapt it to the optimum process conditions by minor changes with respect to the design of the device.

Below, the present invention will be explained on the basis of drawings representing embodiments of the device. However, the invention is not limited to these representations.

DESCRIPTION OF PREFERRED EMBODIMENTS

Figure 1:
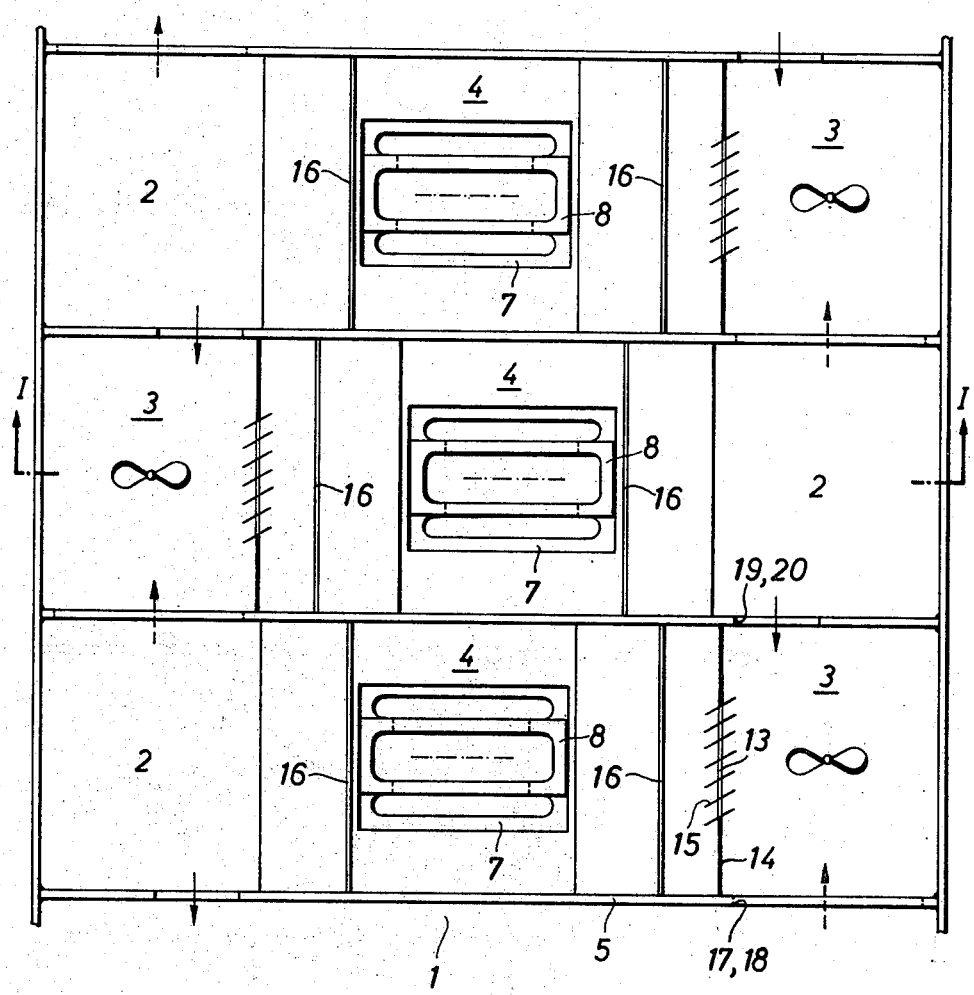
FIG. 1 is a plan view of one embodiment of the invention showing the three individual stages of a mixer-settler, each consisting of a mixer chamber and a settler chamber. Each mixer chamber of a stage is physically connected with the settler chambers of the two adjacent stages.
Figure 2:
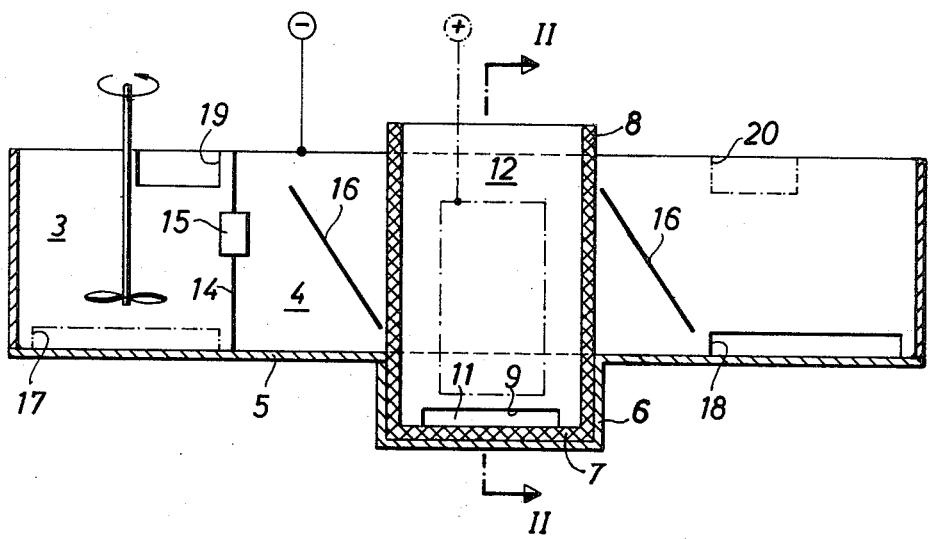
FIG. 2 is a longitudinal section along line I — I in FIG. 1 of a mixer-settler stage.
Figure 3:
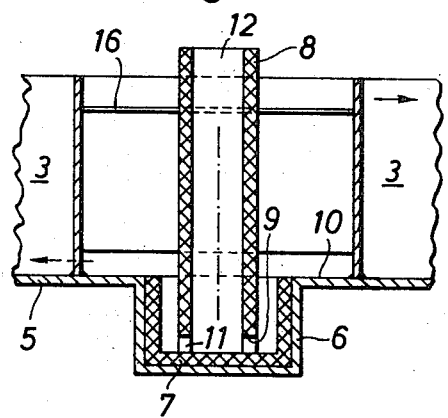
FIG. 3 is a cross section through a settler chamber along line II — II in FIG. 2.

A mixer-settler 1, as shown in FIG. 1, is composed of a number of individual stages 2, each consisting of a mixer chamber 3 and a settler chamber 4. Each individual stage 2 is surrounded by the housing 5 of the electrolysis cell which is made of electrically conducting material, designed as a cathode and hence constitutes the cathode space. The individual stages 2 have recesses 6, as can be seen in FIGS. 2 and 3 in the housings 5 of the electrolysis cells, i.e., in the area of the settler chambers 4, which recesses 6 are lined with insulating material 7 and contain the anode cells 8 made of insulating material. Both the insulating material 7 and the anode cell 8 can be formed by a single body of insulating material as shown in FIGS. 1 and 2. The bottom edge 9 of the anode cells 8 extends below the bottom level 10 of the settler spaces 4 into the recesses 6, thus forming slots 11 together with the insulating material 7, which slots 11 place the anode spaces 12 in communication with the settler spaces 4 which can be regarded as cathode spaces. The mixer chambers 3 are physically connected with the settler chambers 4 by slots 13 in the separation wall 14, the turbulence of the mixer phase being slowed down by damping devices 15 on its passage through the slots 13 into the settler chambers 4. The settler chambers 4 contain internals 16 to improve the flow conditions and geometry of the cathodes. The aqueous phase, containing the compounds to be extracted, enters into the mixer chamber 3 through an opening 17 in the bottom of said mixer chamber, is mixed in it with the organic phase. This mixture then enters the settler chamber 4 of the same stage 2 through a slot 13 as the mixed phase. One of the compounds orginally in the aqueous phase is extracted and transferred into combination with the organic phase. The mixture then leaves through an opening 18 in the bottom of the settler chamber 4. In a countercurrent flow, the organic phase enters the mixer chamber 3 through an opening 19 and leaves stage 2 through an opening 20 in the settler chamber 4.

Figure 4:
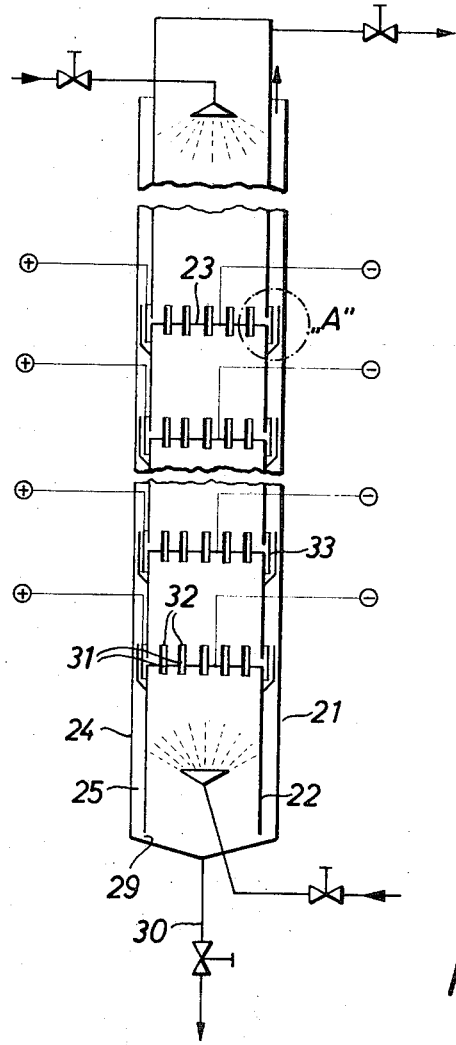
FIG. 4 shows another embodiment of the invention in a longitudinal section through a countercurrent extraction column.
Figure 4A:
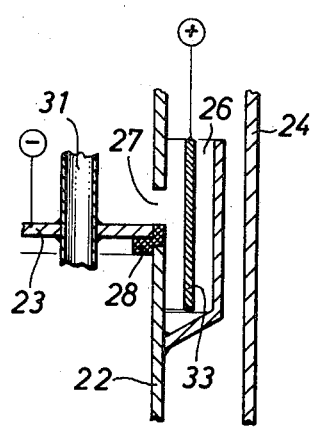
FIGS. 4a and 4b are cross-sectional detail views of two embodiments of the portion "A" of FIG. 4, each with different designs of the anode spaces.
Figure 4B:
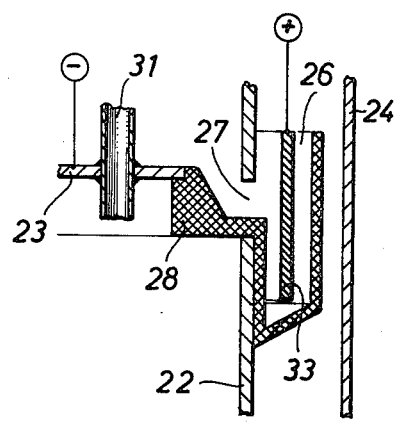

The countercurrent extraction column 21 shown in FIG. 4 consists of an inner tube 22 with column plates 23 installed within it as individual stages and an outer tube 24. The two tubes are fixed relative to each other so as to maintain an annular gap 25. Anode cells 26 are attached to at least one of the two tubes at the level of the column plates 23. The number of anode cells 26 per column plate 23 is of no significance to the invention; it may be one, the anode cell in this case being ring-shaped, for instance, but it may just as well be more than one. The inner tube 22 is physically connected with the outer tube 24 by wall penetrations 27. The penetrations 27 are equipped with an electric insulation 28. Moreover, the two tubes are physically connected with each other by other penetrations 29 of the wall in the inner tube 22 at the bottom end of the column in the area of the discharge opening 30 for the aqueous phase. The column plates 23 have at least one tubular insert 31 through which the different phases can pass and whose upper edge 32 extends beyond the wall penetrations 27. The column plates 23 are designed as the cathode. The anodes 33 may have an annular shape. The insulation 28 may be shaped so as to represent the anode cell 26.

In a preferred embodiment, the cathode material is titanium or a titanium alloy and a material covered with a titanium lining, respectively, if, for instance, nitric acid is to be used in the device according to the invention. Platinum may be used as the anode material.

The device for the separation of plutonium and uranium is applied with high efficiency in a process for the reprocessing of spent nuclear fuels.

What we claim is:

1. A device for continuous extractive separation of compounds of valuable substances existing in one of the two phases which are required to be present for extraction, by electrolytically reducing at least one of the valuable substances and transferring the substance into the other of the two phases, said device comprising: a plurality of interconnected individual stages through which the compounds pass; feeding means for feeding respective first and second phases into respectively different stages; a plurality of electrolytic reducing means, each associated with a respective one of said stages and each including a cathode, an anode cell, and means electrically insulating said anode cell from said cathode while maintaining said anode cell in direct communication with said cathode.

2. A device as defined in claim 1 wherein said first and second feeding means feed the first and second phases, in different directions so that they flow towards each other in a counter current path.

3. A device as defined in claim 1 further comprising a countercurrent extraction column including an inner tube, column plates installed on the inside of said inner tube and defining said plurality of stages and an outer tube arranged coaxially to said inner tube, said inner tube and said outer tube being radially spaced from each other so as to form an annular gap, and said anode cells being attached at the level of said plates to at least one of said tubes.

4. A device as defined in claim 3 wherein the wall of said inner tube has a plurality of passages, one of said passages being located in the area of each of said column plates and each of said anode cells extends below a respective one of said passages.

5. A device as defined in claim 3 further comprising means for discharging one of the two phases, said discharging means being located at a lower end of said column, and wherein the wall of said inner tube has a passage at said lower end of said column.

6. A device as defined in claim 3 wherein the wall of said inner tube has a plurality of passages, one of said passages being located in the area of each of said column plates and further comprising a layer of insulation lining each of said passages.

7. A device as defined in claim 6 further comprising a tubular insert located in each of said column plates and extending beyond an associated one of said passages.

8. A device for continuous extractive separation of compounds of valuable substances existing in one of the two phases which are required to be present for extraction, by electrolytically reducing at least one of the valuable substances and transferring the substance into the other of the two phases, said device being composed of a plurality of interconnected individual stages through which the compounds pass, each said stage including electrolytic reducing means comprising: a cathode, an anode cell, means electrically insulating said anode cell from said cathode while maintaining said anode cell in direct communication with said cathode, wherein each said stage includes a mixer chamber and a settler chamber, and, for each said stage, said cathode forms a housing for said stage.

9. A device as defined in claim 8 wherein said housing has a recess and further comprising a layer of insulation lining said recess.

10. A device as defined in claim 8 wherein, for each said stage, the portion of said housing forming said settler chamber has a recess extending below said settler chamber, said anode cell is disposed within the portion of said housing containing said recess, and a bottom edge of said anode cell extends below a bottom level of said settler chamber into said recess.

11. A device as defined in claim 8 further comprising internal means installed in said settler chamber for improving the flow conditions and the geometry of the cathode.

12. A device as defined in claim 11 wherein said internal means includes a plurality of baffles inclined relative to the longitudinal axis of said housing.

13. A device as defined in claim 11 wherein said internal means includes a plurality of bottom fins extending parallel to the longitudinal axis of said housing.

* * * * *